(12) United States Patent
Kanda et al.

(10) Patent No.: US 11,059,115 B2
(45) Date of Patent: Jul. 13, 2021

(54) GEAR MACHINING APPARATUS AND GEAR MACHINING METHOD

(71) Applicant: JTEKT CORPORATION, Osaka (JP)

(72) Inventors: Daichi Kanda, Kariya (JP); Takaaki Hashimoto, Nagoya (JP); Yuji Sasaki, Takahama (JP); Yoshihiko Yamada, Anjo (JP); Hisashi Otani, Anjo (JP); Yoshitaro Ohsaki, Nukata-gun (JP)

(73) Assignee: JTEKT CORPORATION, Osaka (JP)

( * ) Notice: Subject to any disclaimer, the term of this patent is extended or adjusted under 35 U.S.C. 154(b) by 36 days.

(21) Appl. No.: 16/340,729

(22) PCT Filed: Oct. 11, 2017

(86) PCT No.: PCT/JP2017/036759
§ 371 (c)(1),
(2) Date: Apr. 10, 2019

(87) PCT Pub. No.: WO2018/070403
PCT Pub. Date: Apr. 19, 2018

(65) Prior Publication Data
US 2020/0047268 A1    Feb. 13, 2020

(30) Foreign Application Priority Data

Oct. 13, 2016 (JP) .............................. JP2016-201909
Oct. 10, 2017 (JP) .............................. JP2017-197096

(51) Int. Cl.
*B23F 5/16* (2006.01)
*B23Q 15/14* (2006.01)
(Continued)

(52) U.S. Cl.
CPC ................ *B23F 5/16* (2013.01); *B23F 23/10* (2013.01); *B23F 23/12* (2013.01); *B23Q 15/12* (2013.01); *B23Q 15/14* (2013.01); *B23Q 17/12* (2013.01)

(58) Field of Classification Search
CPC .... B23F 23/10; B23F 125/16; B23F 125/163; B23Q 15/12; B23Q 15/14
See application file for complete search history.

(56) References Cited

U.S. PATENT DOCUMENTS

2012/0099939 A1* 4/2012 Stadtfeld ................. B23F 15/06
409/38
2012/0121353 A1    5/2012 Tsuchimochi
(Continued)

FOREIGN PATENT DOCUMENTS

CN    102574230 A    7/2012
CN    202291683 U    7/2012
(Continued)

OTHER PUBLICATIONS

Combined Chinese Office Action and Search Report dated Feb. 28, 2020, in Patent Application No. 201780062457.7, 10 pages (with English translation).
(Continued)

*Primary Examiner* — Nicole N Ramos
(74) *Attorney, Agent, or Firm* — Oblon, McClelland, Maier & Neustadt, L.L.P.

(57) ABSTRACT

A gear machining apparatus creates a gear on a workpiece W by moving a gear cutting tool relatively with respect to the workpiece along the direction of the rotation axis of the workpiece W while synchronously rotating the gear cutting tool and the workpiece. One of a workpiece rotation speed controlling portion and a tool rotation speed controlling portion varies the rotation speed of one of the workpiece and the gear cutting tool and the other one of the workpiece
(Continued)

rotation speed controlling portion and the tool rotation speed controlling portion synchronizes the rotation speed of the other one of the workpiece and the gear cutting tool with one of the rotation speed of the workpiece and the gear cutting tool.

11 Claims, 8 Drawing Sheets

(51) Int. Cl.
*B23F 23/10* (2006.01)
*B23Q 17/12* (2006.01)
*B23Q 15/12* (2006.01)
*B23F 23/12* (2006.01)

(56) References Cited

U.S. PATENT DOCUMENTS

| | | | |
|---|---|---|---|
| 2012/0190274 A1 | 7/2012 | Ito et al. | |
| 2012/0282055 A1* | 11/2012 | Marx | B23F 5/163 409/37 |
| 2012/0328384 A1* | 12/2012 | Marx | B23F 5/163 409/38 |
| 2013/0071197 A1* | 3/2013 | Marx | B23F 5/163 409/33 |
| 2013/0266391 A1* | 10/2013 | Schweiker | B23F 17/003 409/51 |
| 2015/0147129 A1 | 5/2015 | Nagata | |
| 2015/0328704 A1* | 11/2015 | Otani | B23F 23/006 409/33 |
| 2016/0129511 A1 | 5/2016 | Otani et al. | |
| 2016/0158860 A1* | 6/2016 | Prock | G05B 19/186 409/37 |

FOREIGN PATENT DOCUMENTS

| | | |
|---|---|---|
| CN | 104379287 A | 2/2015 |
| CN | 105583472 A | 5/2016 |
| JP | 49-105277 A | 9/1974 |
| JP | 4-35810 A | 2/1992 |
| JP | 2004-142032 A | 5/2004 |
| JP | 2005-96061 A | 4/2005 |
| JP | 2005-144580 A | 6/2005 |
| JP | 2012-171020 A | 9/2012 |
| JP | 2013-174936 A | 9/2013 |

OTHER PUBLICATIONS

Japanese Notice of Reporting Publication dated Feb. 25, 2020, in Patent Application No. 2017-197096, 8 pages (with English translation).

International Search Report dated Dec. 5, 2017 in PCT/JP2017/036759 filed Oct. 11, 2017.

Office Action dated Mar. 15, 2021 in Chinese Patent Application No. 201780062457.7 with English translation.

* cited by examiner

STABILITY LIMIT INCREASE RATE (%)

ROTATION SPEED OF WORKPIECE (min-1)

STABILITY LIMIT INCREASE RATE (%)

ROTATION SPEED OF WORKPIECE (min-1)

GEAR MACHINING APPARATUS AND GEAR MACHINING METHOD

TECHNICAL FIELD

The present invention relates to a gear machining apparatus and a gear machining method.

BACKGROUND ART

PL 1 discloses a technique for creating a gear in a workpiece while rotating the workpiece and a gear cutting tool (cutter) synchronously.

CITATION LIST

Patent Literature

PL 1: JP-A-2012-171020

SUMMARY OF INVENTION

Technical Problem

When creating a gear in a workpiece by a gear cutting tool, if the rotation speed of the gear cutting tool is increased or a cutting amount is increased, a chattering vibration tends to occur in the workpiece. The chattering vibration is amplified by the periodic contact of tips of the blades of the gear cutting tool with the workpiece. In contrast, the chattering vibration may be reduced by reducing the cutting amount in the workpiece by the gear cutting tool. In this case, however, time required for gear machining is increased, which results in lowering of machining efficiency.

It is an object of the present invention to provide a gear machining apparatus and a gear machining method which can achieve both of improvement of surface features of a machined surface formed on the workpiece and improvement of machining efficiency.

Solution to Problem

The gear machining apparatus according to the present invention is a gear machining apparatus configured to create a gear in a workpiece by moving the gear cutting tool relative to the workpiece along a direction of a rotation axis of the workpiece while synchronously rotating the cutting tool and the workpiece. The gear machining apparatus includes a workpiece rotation speed controlling portion configured to control a rotation speed of the workpiece, and a tool rotation speed controlling portion configured to control the rotation speed of the gear cutting tool, in which one of the workpiece rotation speed controlling portion and the tool rotation speed controlling portion varies the rotation speed of one of the workpiece and the gear cutting tool, the other one of the workpiece rotation speed controlling portion and the tool rotation speed controlling portion synchronizes the rotation speed of the other one of the workpiece and the gear cutting tool with the rotation speed of the one of the workpiece and the gear cutting tool.

The gear machining method according to the present invention is a gear machining method configured to create a gear in a workpiece by moving a gear cutting tool relative to the workpiece along the direction of the rotation axis of the workpiece while synchronously rotating the cutting tool and the workpiece. The gear machining method includes a workpiece rotation speed setting step for varying a rotation speed of the workpiece, and a tool rotating speed setting step for varying the rotation speed of the gear cutting tool synchronously with a variation of the rotation speed of the workpiece, which is set by the workpiece rotation speed setting step.

According to the gear machining apparatus and the gear machining method of the present invention, a cycle of contact of the gear cutting tool with the workpiece becomes irregular when the gear is formed (created) on the workpiece by the gear cutting tool. Accordingly, amplification of a chattering vibration generating in the workpiece is suppressed compared to a case where the rotation speeds of the gear cutting tool and the workpiece are constant without variation. Consequently, with the gear machining apparatus and the gear machining method, the cutting amount of the gear cutting tool with respect to the workpiece can be set to a large value while suppressing generation of the chattering vibration generating in the workpiece W. Accordingly, with the gear machining apparatus and the gear machining method, both of improvement of surface features (surface texture, surface integrity) of the machined surface formed on the workpiece and improvement of machining efficiency are achieved.

DESCRIPTION OF EMBODIMENTS

1. First Embodiment

Figure 1:
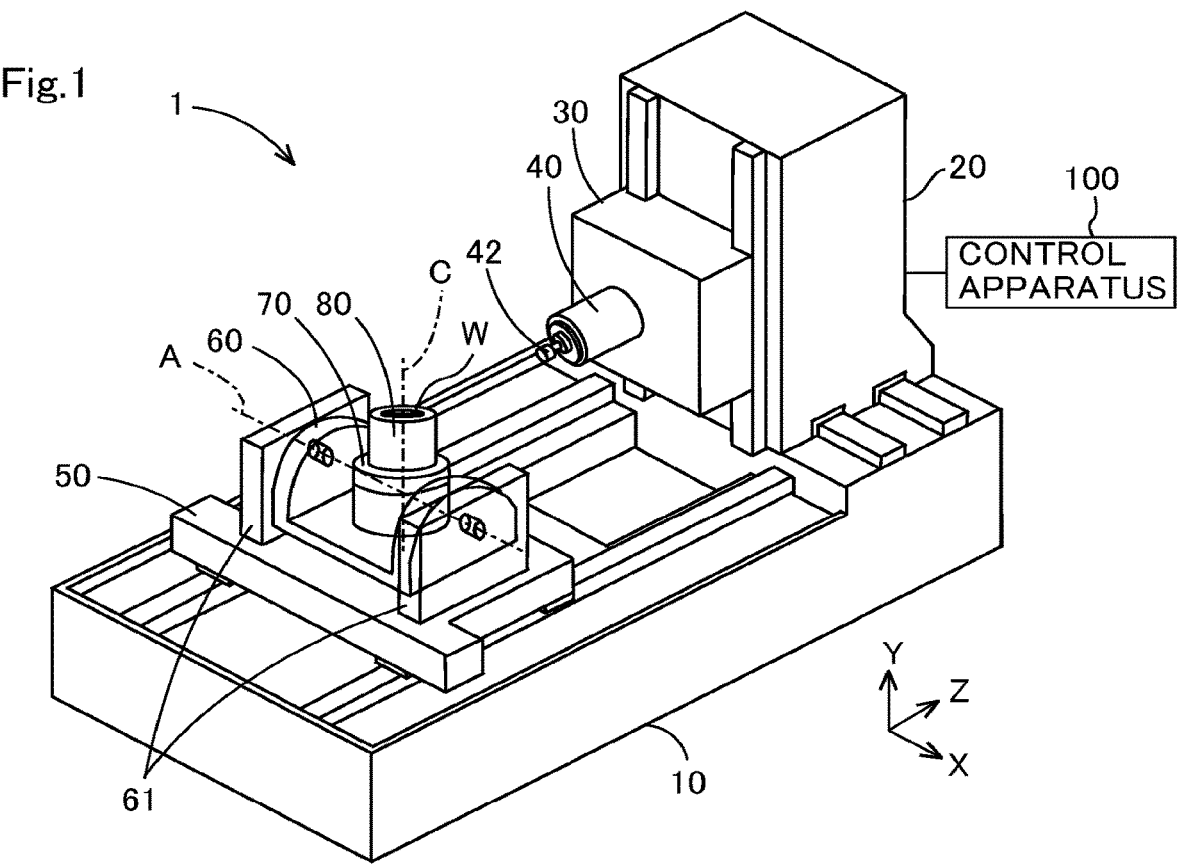
FIG. 1 is a perspective view of a gear machining apparatus according to a first embodiment of the present invention.

Referring to the drawings, embodiments to which a gear machining apparatus and a gear machining method according to the present invention are applied will be described individually. First, an outline of a gear machining apparatus 1 according to a first embodiment of the present invention will be described with reference to FIGS. 1 and 2.

(1-1. Outline of Gear Machining Apparatus 1)

As illustrated in FIG. 1, the gear machining apparatus 1 is a machining center having drive axes including three rectilinear axes (X-axis, Y-axis, and Z-axis) orthogonal to each other and two rotation axes (A-axis and C-axis). The gear machining apparatus 1 mainly includes a bed 10, a column 20, a saddle 30, a rotary main spindle 40, a table 50, a tilt table 60, a turn table 70, a holding unit 80, and a control apparatus 100.

The bed 10 is disposed on a floor. The column 20 and an X-axis motor (not illustrated) are provided on an upper surface of the bed 10, and the column 20 is provided in a manner movable in an X-axis direction (horizontal direction) by being driven by the X-axis motor. The saddle 30 and a Y-axis motor 11 (see FIG. 3) are provided on a side surface of the column 20, and the saddle 30 is provided in a manner movable in a Y-axis direction (vertical direction) by the Y-axis motor 11. The rotary main spindle 40 is provided in a manner rotatable by a spindle motor 41 (see FIG. 3) housed in the saddle 30. A gear cutting tool 42 is fixed to a distal end of the rotary main spindle 40. The gear cutting tool 42 rotates in conjunction with a rotation of the rotary main spindle 40.

Figure 2:
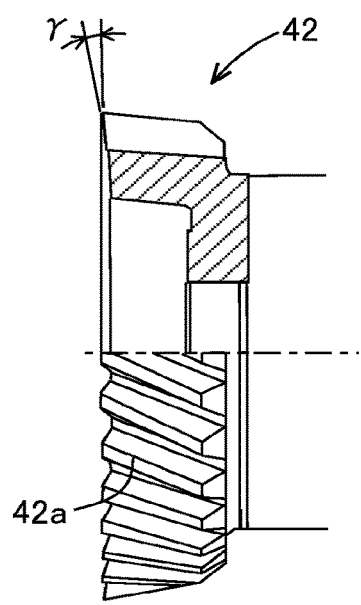
FIG. 2 is a drawing illustrating a gear cutting tool fixed to a rotary main spindle in an enlarged scale.

Referring now to FIG. 2, the gear cutting tool 42 will be described. As illustrated in FIG. 2, the gear cutting tool 42 is a skiving cutter provided with a plurality of blades 42a on an outer peripheral surface. An end surface of each of the blades 42a constitutes a rake face having a rake angle γ. The rake faces of each of the blades 42a may have a tapered shape about a center axis of the gear cutting tool 42, or may be formed into surfaces facing directions different from one blade 42a to another.

Referring back to FIG. 1, description will be continued. The table 50 and a Z-axis motor 12 (see FIG. 4) are provided on the upper surface of the bed 10. The table 50 is provided in a manner movable in a Z-axis direction (horizontal direction) by the Z-axis motor 12. A tilt table support portion 61 configured to support the tilt table 60 is provided on an upper surface of the table 50. The tilt table support portion 61 is provided in a manner that the tilt table 60 is pivotable about the A-axis (horizontal direction). A table motor 62 (see FIG. 3) is provided on a bottom surface of the tilt table 60. The turn table 70 is provided in a manner rotatable by the table motor 62 about the C-axis orthogonal to the A-axis. The holding unit 80 for holding a workpiece W is mounted on the turn table 70.

The control apparatus 100 is configured to control a rotation speed V1 of the workpiece W, a rotation speed V2 of the gear cutting tool 42, and a feed rate V4 of the gear cutting tool 42 in a direction of the rotation axis (Z-axis direction) with respect to the workpiece W. Note that, although the case where the table 50 is configured to be movable in the Z-axis direction is exemplified for description in this embodiment, a configuration in which the column 20 instead of the table 50 is movable in the Z-axis direction is also applicable.

Figure 3:
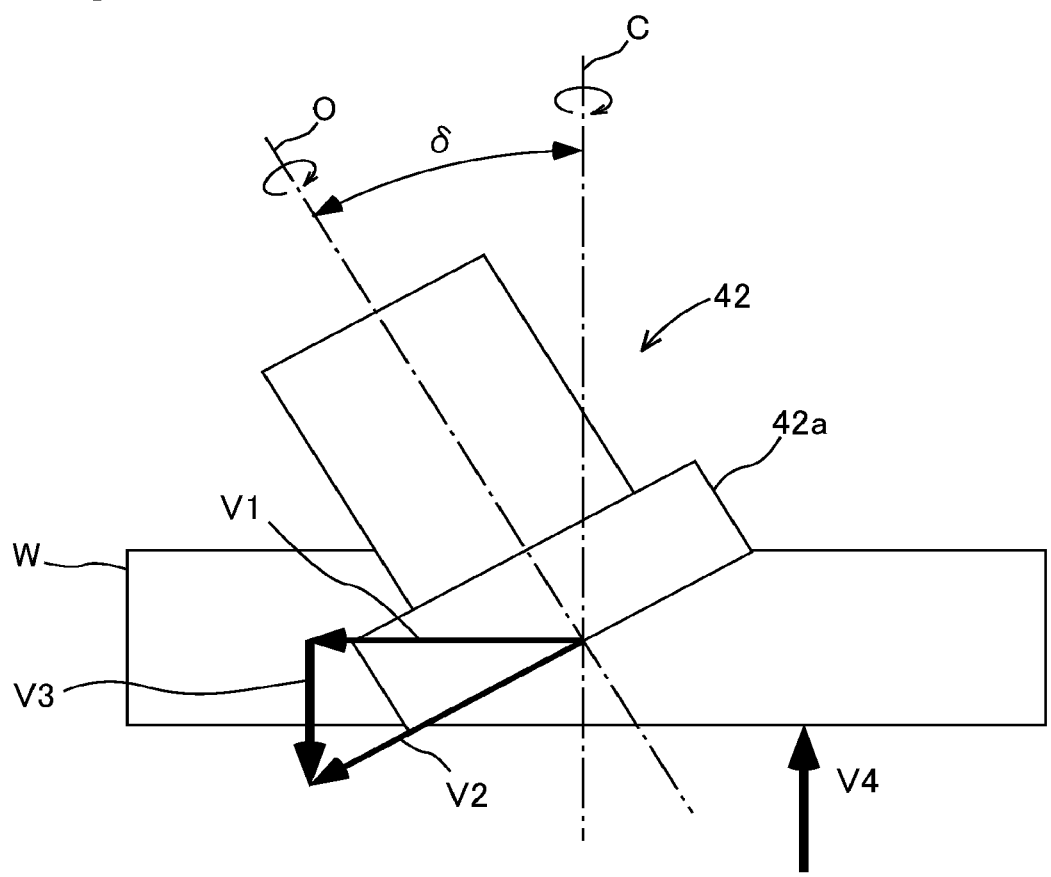
FIG. 3 is a drawing illustrating actions of the gear cutting tool and a workpiece when performing skiving process.

Now, as illustrated in FIG. 3, the gear machining apparatus 1 creates a gear in the workpiece W by a skiving process. Specifically, in the gear machining apparatus 1, the C-axis, which is a rotation axis of the workpiece W, is inclined with respect to a rotation axis O of the gear cutting tool 42 by making the tilt table 60 to pivot about the A-axis. Note that an angle of inclination of the rotation axis O of the gear cutting tool 42 with respect to the rotation axis of the workpiece W is referred to as an intersection angle δ. Then, the gear machining apparatus 1 creates the gear on the workpiece W by feeding (relatively moving) the gear cutting tool 42 toward the center axis of the workpiece W while synchronously rotating the workpiece W and the gear cutting tool 42.

In the skiving process, the rotation speed V2 of the gear cutting tool 42 and the rotation speed V1 of the workpiece W are determined based on the intersection angle δ and a cutting speed V3. The cutting speed V3 and the feed rate V4 are set based on process time (cycle time) required for gear machining, specifications of the gear cutting tool 42, a material of the workpiece W, and a helix angle of the gear to be formed on the workpiece W, and the like. In other words, the cutting speed V3 and the feed rate V4 are set to an optimal speed considering the machining efficiency when performing the gear machining and a tool life or the like of the gear cutting tool 42. The skiving process has a tendency such that the faster the cutting speed V3 and the feed rate V4 are set, the more the machining efficiency is improved, while the lower the quality such as the surface features becomes.

In this regard, in the gear machining apparatus 1, the rotation speed V1 of the workpiece W determined based on the optimal cutting speed V3 and intersection angle δ is a reference rotation speed Nw. The gear machining apparatus 1 performs the gear machining while varying the rotation speed V1 of the workpiece W with reference to the reference rotation speed Nw. In this machining, the gear machining apparatus 1 varies the rotation speed V2 of the gear cutting tool 42 to be synchronized with the rotation speed V1 pf the workpiece W during the gear machining.

In addition, in the gear machining apparatus 1, the feed rate V4 of the workpiece W determined based on the optimal cutting speed V3 and intersection angle δ corresponds to a reference feed rate Fw. The gear machining apparatus 1 then varies the feed rate V4 to be synchronized with the rotation speed V1 of the workpiece W with reference to the reference feed rate Fw.

(1-2. Control Apparatus 100)

Figure 4:
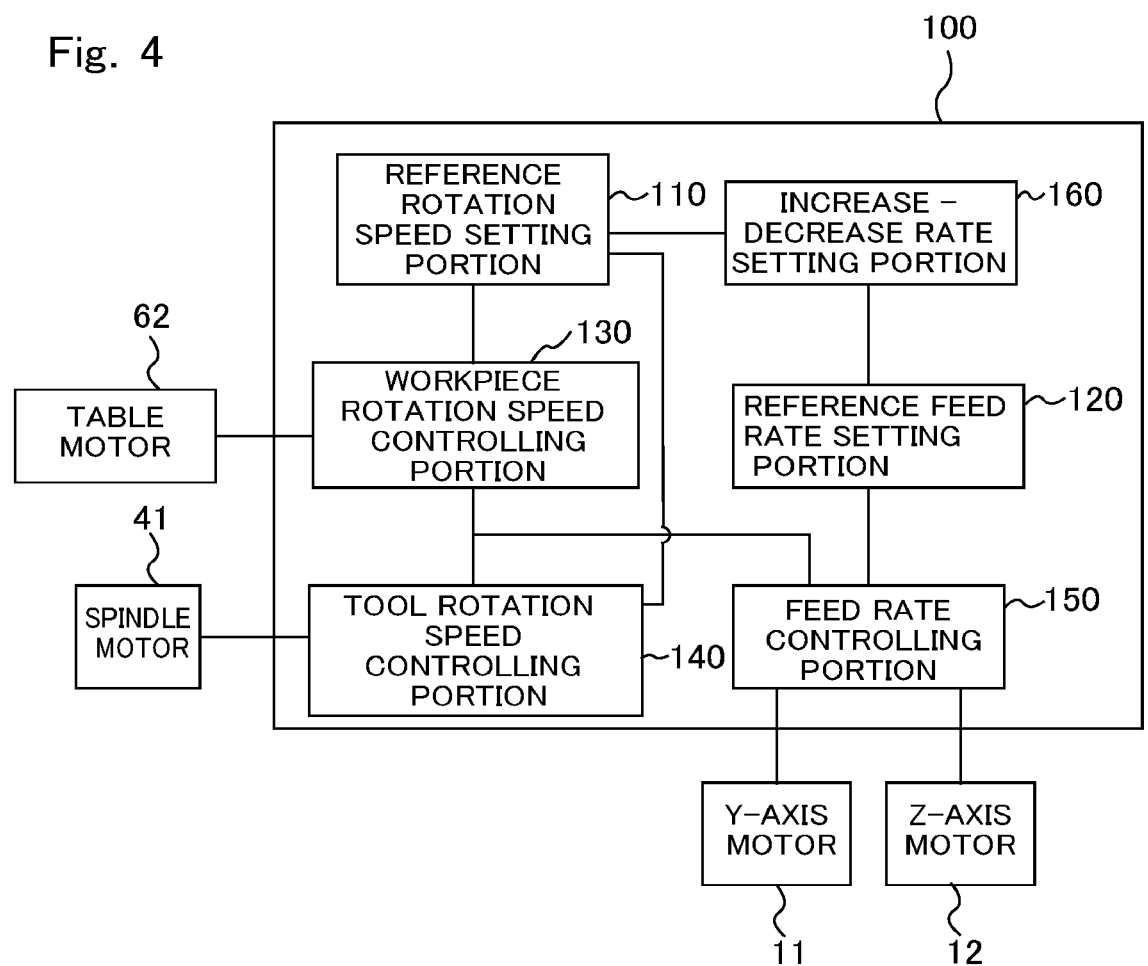
FIG. 4 is a block diagram of a control apparatus.

Next, the control apparatus 100 will be described in detail with reference to FIG. 4. The control apparatus 100 includes a reference rotation speed setting portion 110, a reference feed rate setting portion 120, a workpiece rotation speed controlling portion 130, a tool rotation speed controlling portion 140, a feed rate controlling portion 150, and an increase-decrease rate setting portion 160.

The reference rotation speed setting portion 110 sets the reference rotation speed Nw determined based on the cutting speed V3 and the intersection angle δ. The reference feed rate setting portion 120 sets the reference feed rate Fw determined based on the cutting speed V3 and the intersection angle δ.

The workpiece rotation speed controlling portion 130 drives and controls the table motor 62 and varies the rotation speed V1 of the workpiece W. The tool rotation speed controlling portion 140 drives and controls the spindle motor 41 to vary the rotation speed V2 of the gear cutting tool 42, and simultaneously, synchronizes the rotation speed V2 of the gear cutting tool 42 with the rotation speed V1 of the workpiece W. The feed rate controlling portion 150 drives and controls the Y-axis motor 11 and the Z-axis motor 12 and adjusts a relative distance between the gear cutting tool 42 and the workpiece W while varying the feed rate V4 to achieve synchronization of the feed rate V4 and the rotation speed of the workpiece W.

The increase-decrease rate setting portion 160 sets a speed increase-decrease rate and a frequency increase-decrease rate of the rotation speed V1 of the workpiece W. The speed increase-decrease rate of the rotation speed V1 of the workpiece W is set to an increase-decrease rate which can suppress generation of chattering vibration or the like of the workpiece W. The frequency increase-decrease rate of the rotation speed V1 of the workpiece W is then set based on a natural frequency of the workpiece W obtained by simulation based on the rotation speed V2 of the gear cutting tool 42, the rotation speed V1 of the workpiece W, a cutting force for the workpiece W or the like or by measurement obtained by hammering or the like.

(1-3. Gear Machining Process)

Next, referring to FIG. 5 and FIG. 6, the gear machining process executed by the control apparatus 100 will be described. Note that the reference rotation speed Nw is set to the reference rotation speed setting portion 110, and the reference feed rate Fw is set to the reference feed rate setting portion 120, respectively for executing the gear machining process. Also, the speed increase-decrease rate and the frequency increase-decrease rate of the rotation speed V1 of the workpiece W are set to the increase-decrease rate setting portion 160.

Figure 5:
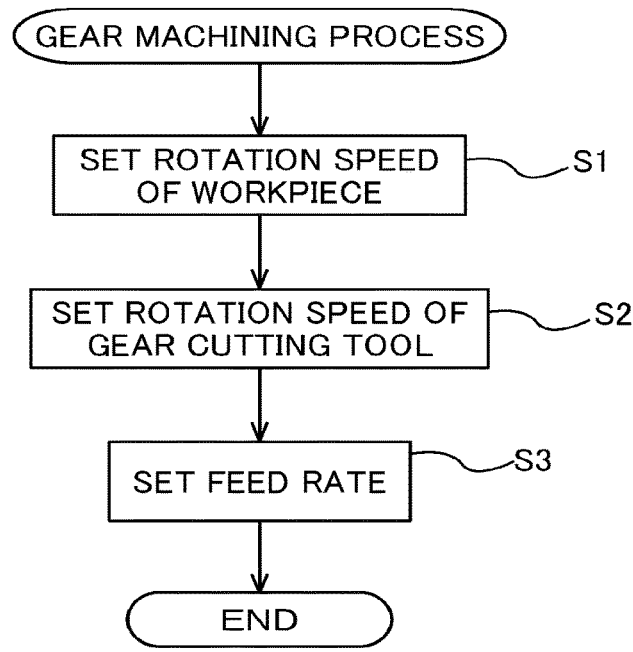
FIG. 5 is a flowchart illustrating a gear machining process to be performed by the control apparatus.

First, in the gear machining process, the rotation speed V1 of the workpiece W is set under the control of the workpiece rotation speed controlling portion 130 (S1: workpiece rotation speed setting step) as illustrated in FIG. 5. Specifically, the workpiece rotation speed controlling portion 130 increases and decreases the rotation speed V1 of the workpiece W repeatedly at regular cycles based on the reference rotation speed Nw and values of the speed increase-decrease rate and the frequency increase-decrease rate as illustrated by a thick line in FIG. 6.

Note that an upper speed value and a lower speed value of the rotation speed V1 of the workpiece W correspond to a value obtained by multiplying the reference rotation speed Nw by the speed increase-decrease rate. For example, when the reference rotation speed Nw is set to 1000 min$^{-1}$ and the speed increase-decrease rate is set to ±15%, the upper speed value is 1150 min$^{-1}$ and the lower speed value is 850 min$^{-1}$. The rotation speed V1 of the workpiece W then varies cyclically in respective variation cycles at between the rotation speed equal to or lower than the upper speed value and the rotation speed equal to or larger than the lower speed value. In other words, the rotation speed V1 of the workpiece W has a speed variation width of at least 300 min$^{-1}$, increases and decreases cyclically at least within a range of 850 min$^{-1}$ to 1150 min$^{-1}$. The variation amplitude of the graph illustrated in FIG. 6 corresponds to the speed variation width of the rotation speed V1 of the workpiece W.

Furthermore, a variation frequency of the rotation speed V1 of the workpiece W is a value obtained by multiplying the value of the reference rotation speed Nw of the workpiece W by the value of the frequency increase-decrease rate of the rotation speed V1 of the workpiece W. For example, when the reference rotation speed Nw is 1200 min$^{-1}$ (20 Hz), and the frequency increase-decrease rate of the rotation speed V1 of the workpiece W is 5%, the variation frequency (Hz) is 20 Hz×5%=1 Hz.

After the process of S1, the gear machining process sets the rotation speed V2 of the gear cutting tool 42 under the control of the tool rotation speed controlling portion 140 (S2: tool rotation speed setting process). Specifically, the tool rotation speed controlling portion 140 sets the rotation speed V2 of the gear cutting tool 42 so that the rotation speed V2 of the gear cutting tool 42 and the rotation speed V1 of the workpiece W are synchronized based on a gear ratio between a gear formed on the workpiece W and the gear cutting tool 42, the rotation speed V1 of the workpiece W set by the workpiece rotation speed controlling portion 130, and the like.

For example, it is assumed that the reference rotation speed Nw is 1000 min$^{-1}$, the speed increase-decrease rate is ±15%, and a gear ratio between the number of teeth of the gear formed on the workpiece W and the number of teeth of the gear cutting tool 42 is 3:1. In this case, the tool rotation speed controlling portion 140 varies cyclically the rotation speed V2 of the gear cutting tool 42 within a range from 2550 min$^{-1}$ to 3450 min$^{-1}$. In this case, the tool rotation speed controlling portion 140 increases and decreases the rotation speed V2 of the gear cutting tool 42 repeatedly so that the variation frequency of the rotation speed V2 of the gear cutting tool 42 becomes 1 Hz (becomes the same as the variation frequency of the rotation speed V1 of the workpiece W).

Accordingly, the rotation speed V2 of the gear cutting tool 42 increases and decreases cyclically synchronously with the rotation speed V1 of the workpiece W. The gear cutting tool 42 then performs continuous gear machining on the workpiece W while meshing with the workpiece W and creates a tooth surface shape on the workpiece W.

After the process of S2, the gear machining process sets the feed rate under the control of the feed rate controlling portion 150 (S3; feed rate setting step). In the process of S3, the feed rate controlling portion 150 varies the feed rate V4 so that the feed rate V4 is synchronized with the variation frequency of the rotation speed V1 of the workpiece W based on the reference feed rate Fw and the variation frequency of the rotation speed V1 of the workpiece W. Accordingly, the feed rate V4 increases and decreases repeatedly at regular cycles.

Figure 7A:
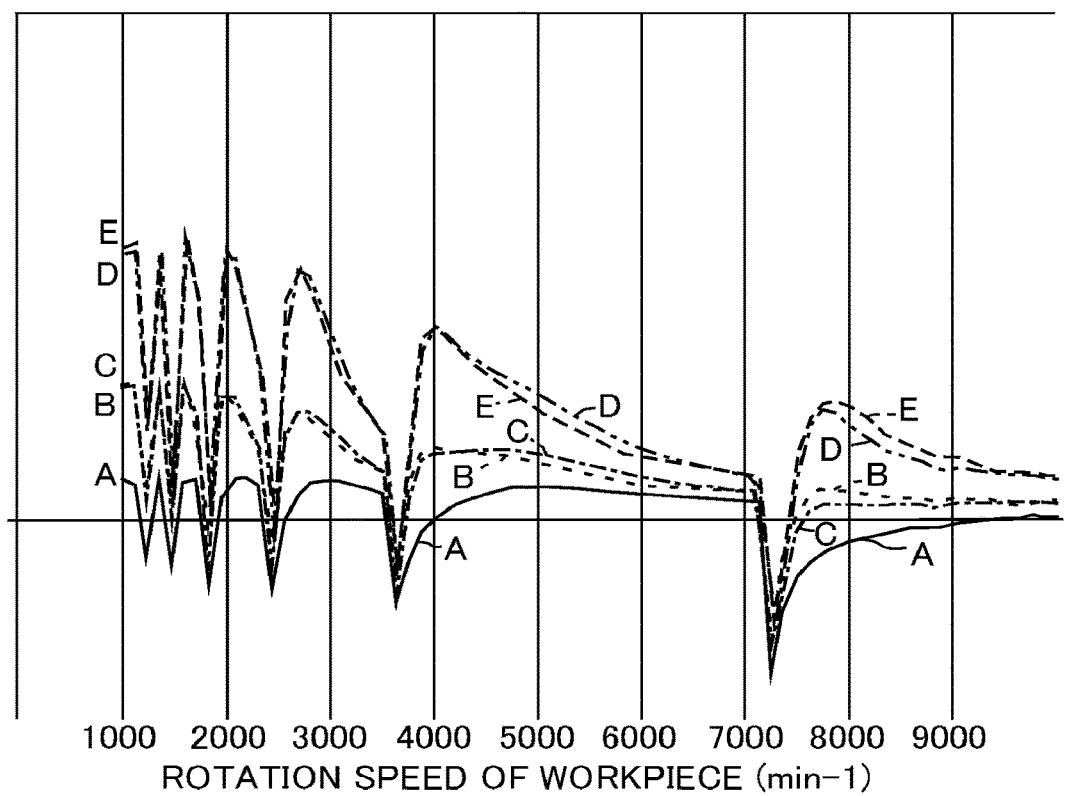
FIG. 7A is a graph indicating a relationship between the rotation speed and a stability limit increase rate of the workpiece, and is a stability limit line map of five patterns obtained by setting a rotation speed variation rate or a variation frequency rate to different values.
Figure 7B:
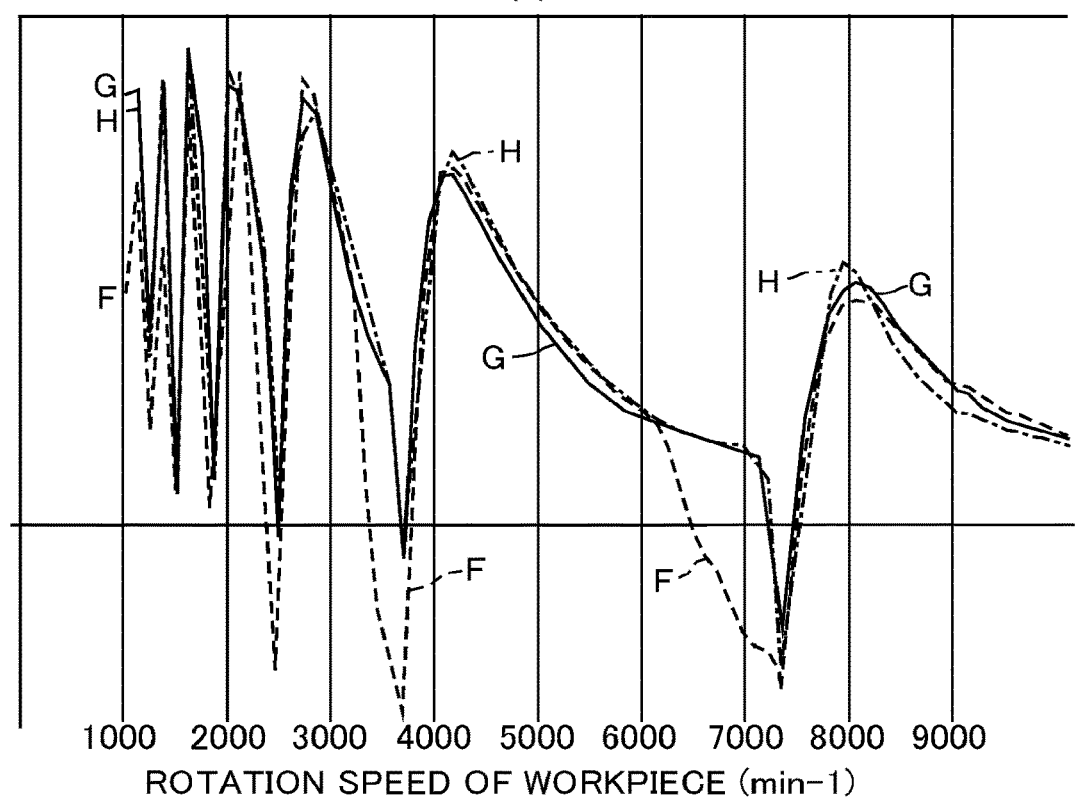
FIG. 7B is a graph indicating a relationship between the rotation speed and a stability limit increase rate of the workpiece and is a stability limit line map of three patterns in which variation frequency rate is set to different values while maintaining the rotation speed variation rate constant.

Referring now to FIG. 7A and FIG. 7B, a relationship between variation in the rotation speed V1 of the workpiece W and the chattering vibration generated in the workpiece W during the gear machining will be described. FIG. 7A and FIG. 7B are graphs indicating the relationship between the rotation speed V1 (reference rotation speed Nw) of the workpiece W and the increasing rate (the stability limit increase rate) of the cutting amount by the gear cutting tool 42 in a case where the gear machining is performed at a predetermined speed increase-decrease rate and at a predetermined variation frequency rate. In FIG. 7A and FIG. 7B, an abscissa axis indicates the rotation speed V1 of the workpiece W (the reference rotation speed Nw), and a vertical axis indicates the stability limit increase rate when compared to a case where the gear machining is performed without varying the rotation speed V1 in a state of maintaining the reference rotation speed Nw. In addition, the stability limit increase rate indicated in these graphs is obtained based on the natural frequency of the workpiece W calculated from simulation or hammering based on the number of rotation of the workpiece W, the number of rotation of the gear cutting tool 42, the cutting force (resistance) for the workpiece W and the like.

The graphs according to FIG. 7A and FIG. 7B indicate that if the cutting amount (stability limit) with respect to the workpiece W rotating at a predetermined reference rotation speed Nw is set to a value smaller than the cutting amounts indicated by line graphs A to H, a stable gear machining can be performed without causing the chattering vibration in the workpiece W. Also, the graphs according to FIGS. 7A and 7B indicate that the higher the stability limit increase rate, the more the machining efficiency is improved.

The graph line A illustrated in FIG. 7A indicates the stability limit increase rate when the speed increase-decrease rate of the rotation speed V1 of the workpiece W with respect to the reference rotation speed Nw is ±5% and the variation frequency rate of the rotation speed is 20%. The graph line B indicates the stability limit increase rate when the speed increase-decrease rate of the rotation speed V1 of the workpiece W with respect to the reference rotation speed Nw is ±10% and the variation frequency rate of the rotation speed V1 is 10%. The graph line C indicates the stability limit increase rate when the speed increase-decrease rate of the rotation speed V1 of the workpiece W with respect to the reference rotation speed Nw is ±10% and the variation frequency rate of the rotation speed V1 is 20%. The graph line B and the graph line C have a higher stability limit increase rate than the graph line A. From this reason, when the speed increase-decrease rate of the rotation speed V1 of workpiece W is ±10%, the stability limit increase rate is considered to become higher than a case where the speed increase-decrease rate of the rotation speed V1 of workpiece W is ±5%.

The graph line D indicates the stability limit increase rate when the speed increase-decrease rate of the rotation speed V1 of the workpiece W with respect to the reference rotation speed Nw is ±15% and the variation frequency rate of the rotation speed V1 is 10%. The graph line E indicates the stability limit increase rate when the speed increase-decrease rate of the rotation speed V1 of the workpiece W with respect to the reference rotation speed Nw is ±15% and the variation frequency rate of the rotation speed V1 is 30%. The graph line D and the graph line E have a higher stability limit increase rate than the graph line B and the graph line C. From this reason, when the speed increase-decrease rate of the rotation speed V1 of workpiece W is ±15%, the stability limit increase rate is considered to become higher than a case where the speed increase-decrease rate of the rotation speed V1 of workpiece W is ±10%.

The graph line F illustrated in FIG. 7B indicates the stability limit increase rate when the speed increase-decrease rate of the rotation speed V1 of the workpiece W with respect to the reference rotation speed Nw is ±20% and the variation frequency rate of the rotation speed V1 is 1%. The graph line G indicates the stability limit increase rate when the speed increase-decrease rate of the rotation speed V1 of the workpiece W with respect to the reference rotation speed Nw is ±20% and the variation frequency rate of the rotation speed V1 is 5%. The graph line H indicates the stability limit increase rate when the speed increase-decrease rate of the rotation speed V1 of the workpiece W with respect to the reference rotation speed Nw is ±20% and the variation frequency rate of the rotation speed V1 is 20%.

The graph line G and the graph line H indicate a smaller range of the rotation speed V1 of the workpiece W in which the stability limit increase rate becomes below zero compared to the graph line F. Accordingly, it is considered that when the variation frequency rate of the rotation speed V1 of the workpiece W is equal or higher than 5%, generation of the chattering vibration is suppressed compared to the case where the variation frequency rate of the rotation speed V1 of the workpiece W is 1%.

Figure 8:
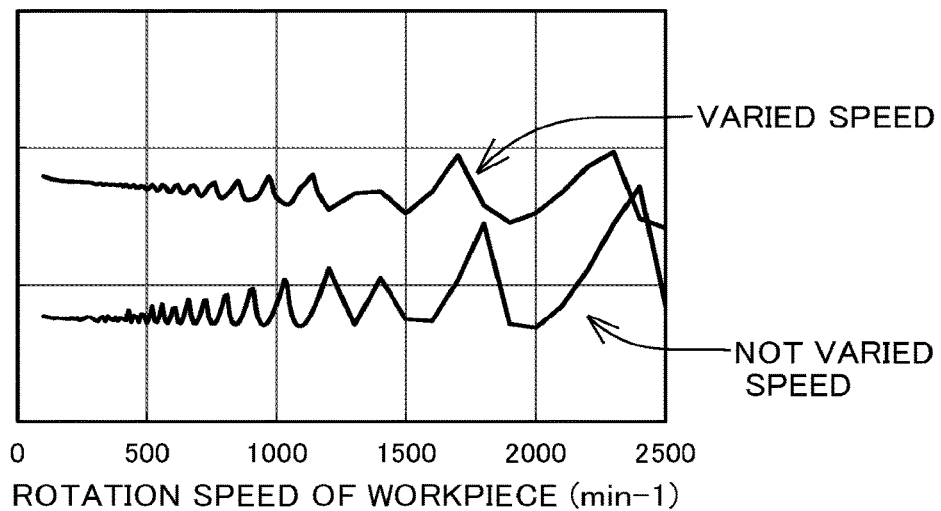
FIG. 8 is a graph indicating a relationship between the rotation speed and the stability limit of the workpiece, and illustrating a comparison between cases where the rotation speeds of the gear cutting tool and the workpiece are varied and not varied.

FIG. 8 is a graph of a comparison between a case where a stability limit of a case where the gear machining is performed without varying the rotation speed V1 and a stability limit of a case where the speed increase-decrease rate of the rotation speed V1 is set to ±15% and the variation frequency rate of the rotation speed V1 is set to 5%. As illustrated in FIG. 8, when the reference rotation speed is 1200 min$^{-1}$, for example, the stability limit increase rate can be doubled when the rotation speed V1 of the workpiece W is varied compared to a case where the rotation speed V1 is not varied.

In the gear machining by the gear machining apparatus 1, the reference rotation speed Nw corresponding to the workpiece W is set to the reference rotation speed setting portion 110 based on the relationship between the rotation speed V1 of the workpiece W and the stability limit. The workpiece rotation speed controlling portion 130 increases and decreases the rotation speed V1 of the workpiece W repeatedly, while the tool rotation speed controlling portion 140 increases and decreases the rotation speed V2 of the gear cutting tool 42 synchronously with the rotation speed V1 of the workpiece W. In this case, the gear machining apparatus 1 does not have to consider the gear ratio between the gear cutting tool 42 and the workpiece W compared to the case where the reference rotation speed Nw of the gear cutting tool 42 is set, and thus easier setting of the reference rotation speed Nw is enabled correspondingly.

In this manner, the workpiece rotation speed controlling portion 130 increases and decreases the rotation speed V1 of the workpiece W repeatedly at a high speed, while the tool rotation speed controlling portion 140 synchronizes the rotation speed V2 of the gear cutting tool 42 with the rotation speed V1 of the workpiece W. In this case, a cutting force (cutting cross sectional area) that each of the blades 42a (see FIG. 2) of the gear cutting tool 42 can be cut the workpiece W becomes uneven. Consequently, at the time of the gear machining, the gear machining apparatus 1 can suppress amplification of regenerative chattering vibration generated in the workpiece W compared to a case where the rotation speed V1 of the workpiece W and the rotation speed V2 of the gear cutting tool 42 are not varied and kept constant. Therefore, the gear machining apparatus 1 can set the cutting amount (stability limit) of the gear cutting tool 42 for the workpiece W while suppressing the chattering vibration generating in the workpiece W for the gear machining of the workpiece W. Accordingly, the gear machining apparatus 1 can achieve both of improvement of the surface features of the machined surface formed on the workpiece W and improvement of the machining efficiency.

The workpiece rotation speed controlling portion 130 sets the speed increase-decrease rate of the rotation speed V1 of the workpiece W to achieve so that the upper speed value of the rotation speed V1 of the workpiece W reaches 10% or more, preferably 15% or more, and the lower speed value of the rotation speed V1 of the workpiece W reaches −10% or below, preferably −15% or below in the respective variation cycles. In addition, the workpiece rotation speed controlling portion 130 sets the variation frequency rate of the rotation speed V1 of the workpiece W to be 5% or higher, and increases and decreases the rotation speed V1 of the workpiece W between the rotation speed V1 equal to or lower than the upper speed value and the rotation speed V1 equal to or lower than the lower speed value in the respective variation cycles. Accordingly, the gear machining apparatus 1 can increase the stability limit effectively during the gear machining of the workpiece W.

When the rotation speed V1 of the workpiece W and the rotation speed V2 of the gear cutting tool 42 are varied in a state in which the feed rate of the gear cutting tool 42 is kept constant, a wave or the like is generated on the machined surface formed on the workpiece W, and thus the surface features of the machined surface is lowered. In contrast, the feed rate controlling portion 150 increases and decreases the feed rate V4 for the reference feed rate Fw set by a cycle time for machining one workpiece W. The feed rate controlling portion 150 then synchronizes the increase and decrease cycle of the feed rate V4 with the variation frequency of the rotation speed V1 of the workpiece W.

As compared to the case where the rotation speed V1 of the workpiece W and the rotation speed V2 of the gear cutting tool 42 are increased and decreased without varying the feed rate V4, the tooth surface formed on the workpiece W by the gear cutting tool 42 can improve the surface features of the tooth surface. When gear machining by skiving process is performed, the gear machining apparatus 1 can achieve both improvement of surface features of machined surface formed on the workpiece W and improvement of machining efficiency.

Note that the holding unit 80 configured to hold the workpiece W, the turn table 70, and the tilt table 60 have low retention rigidity compared to the gear cutting tool 42 and thus the chattering vibration tends to be generated. Regarding this point, in the gear machining apparatus 1, the workpiece rotation speed controlling portion 130 repeatedly increases and decreases the rotation speed V1 of workpiece W. Then, the tool rotation speed controlling portion 140 increases and decreases the rotation speed V2 of the gear cutting tool 42 synchronously with the rotation speed V1 of workpiece W. Accordingly, the gear machining apparatus 1 can effectively suppress the generation of the chattering vibration generating in the workpiece W while rotating the gear cutting tool 42 at high speed.

Also, when workpiece W is a helical gear, the rotation speed V1 of workpiece W and the rotation speed V2 of gear cutting tool 42 can be formed (created) by shifting it in accordance with a direction of a tooth trace of the workpiece W. At this time, the fluctuation range (variation frequency and speed fluctuation width) of the rotation speed V1 of the workpiece W is adjusted according to the direction of a tooth trace of a helical gear, which corresponds to the workpiece W.

(1-4. Modification of First Embodiment)

Here, a modification of the first embodiment will be described. In the above embodiment, the case where the workpiece rotation speed controlling portion 130 repeatedly increases and decreases the rotation speed V1 of workpiece W has been described. In contrast, the workpiece rotation speed controlling portion 130 may linearly accelerate or decelerate the rotation speed V1 of the workpiece W.

Figure 9A:
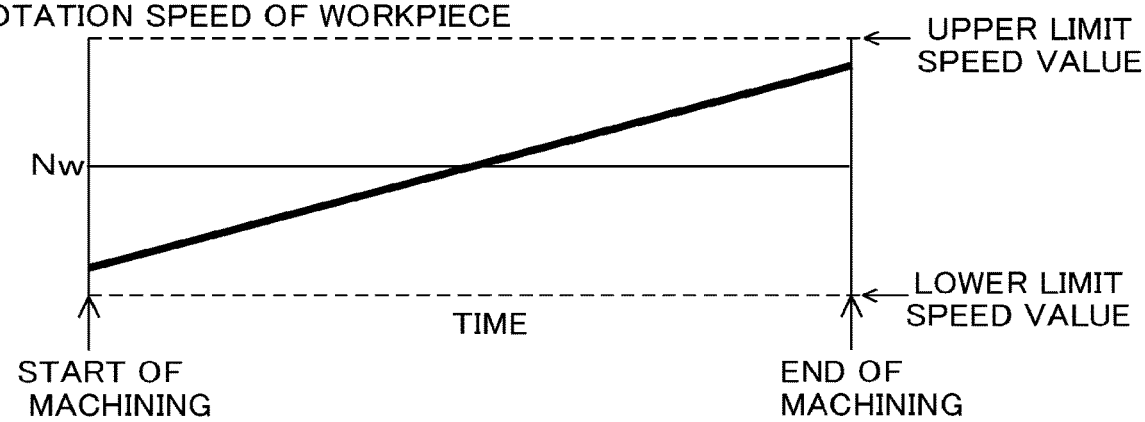
FIG. 9A is a graph illustrating a variation of the rotation speeds of a gear cutting tool and a workpiece according to a first modification.
Figure 9B:
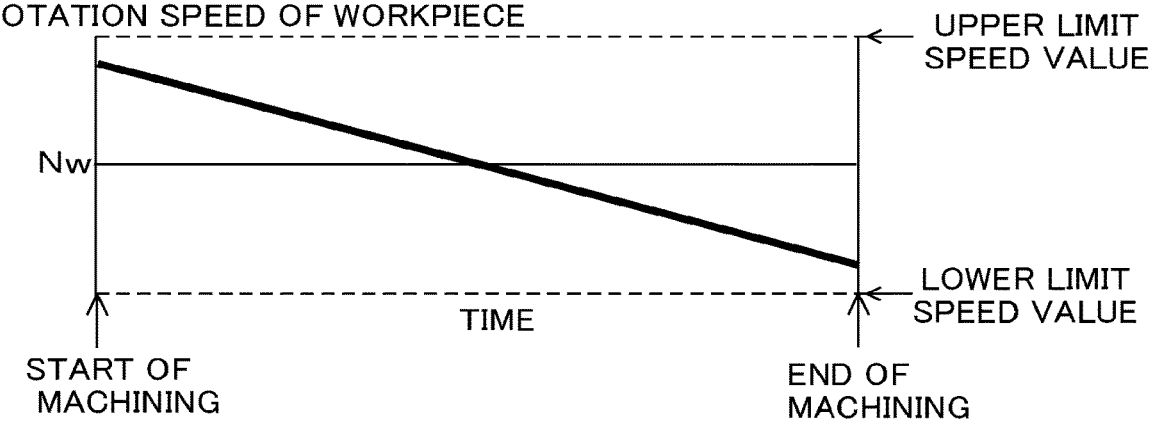
FIG. 9B is a graph illustrating a variation of the rotation speeds of a gear cutting tool and a workpiece according to a second modification.
Figure 9C:
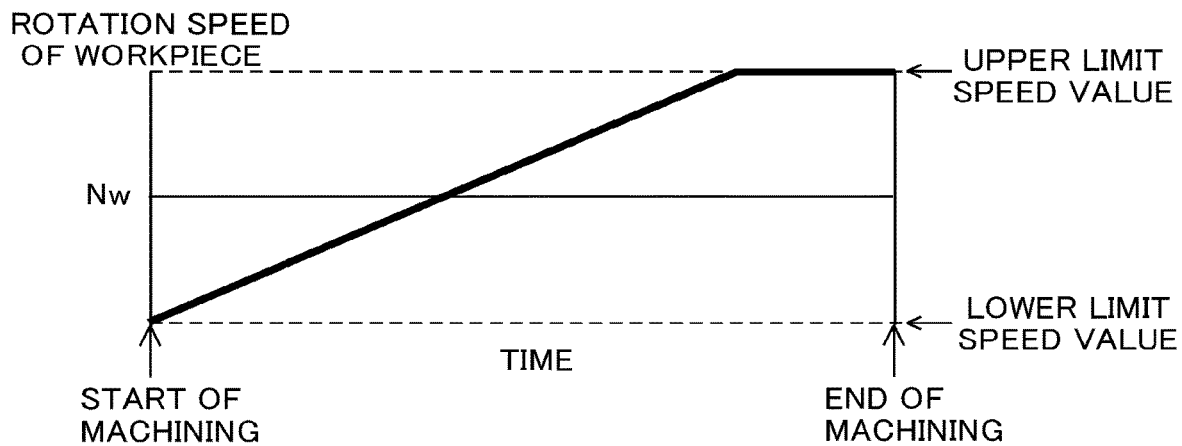
FIG. 9C is a graph illustrating a variation of the rotation speeds of a gear cutting tool and a workpiece according to a third modification.
Figure 9D:
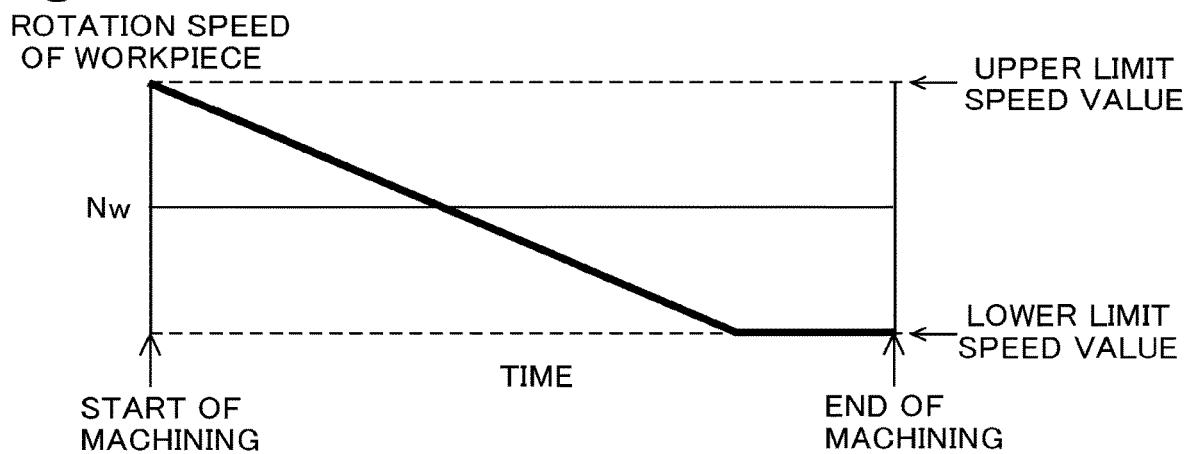
FIG. 9D is a graph illustrating a variation of the rotation speeds of a gear cutting tool and a workpiece according to a fourth modification.

For example, the workpiece rotation speed controlling portion 130 may accelerate the rotation speed V1 of the workpiece W at a constant acceleration as in the first modification illustrated in FIG. 9A. Similarly, the workpiece rotation speed controlling portion 130 may decelerate the rotation speed V1 of workpiece at a constant deceleration as in a second modification illustrated in FIG. 9B.

In these cases, the reference rotation speed setting portion 110 calculates the optimum cutting speed based on the process time (cycle time) required for gear machining, the specifications of gear cutting tool 42, the material of the workpiece W, and the helix angle of gear formed in the workpiece W and so on. The reference rotation speed setting portion 110 sets the rotation speed V1 of workpiece W derived from the calculated cutting speed to the reference rotation speed Nw.

Further, the workpiece rotation speed controlling portion 130 calculates the allowable cutting speed range from a viewpoint of the tool life, and calculates the upper limit speed value and the lower limit speed value, which are an upper limit value and a lower limit value of the allowable rotation speed V1 of the workpiece W. Based on the upper limit speed value and the lower limit speed value of the rotation speed V1 and the process time, the workpiece rotation speed controlling portion 130 sets the acceleration and deceleration of the rotation speed V1 and the rotation speed V1 when the gear machining is started and ended so that the rotation speed V1 at the time of gear machining does not exceed the upper limit speed value and the lower limit speed value.

In this case as well, the gear machining apparatus 1 can suppress the amplification of regenerative chattering vibration generated in workpiece W during gear machining. Therefore, the gear machining apparatus 1 can achieve both improvement of surface features of machined surface formed on workpiece W and improvement of machining efficiency.

The gear machining apparatus 1 also varies the rotation speed V1 of workpiece W at a constant acceleration or deceleration. In this case, the gear machining apparatus 1 can be suppressed the synchronization error between the rotation speed V1 of the workpiece W and the rotation speed V2 of the gear cutting tool 42 as compared to the case where the rotation speed V1 of the workpiece W is varied while changing the acceleration or the deceleration. Furthermore, since the gear machining apparatus 1 in the first modification and the second modification varies the rotation speed V1 of the workpiece W from the start to the end of the gear machining, the amplification of regenerative chattering vibration can be effectively suppressed.

In addition, in this case, the gear machining apparatus 1 can gradually vary the rotation speed V1 as compared to the case where the rotation speed V1 of the workpiece W is repeatedly increased and decreased. Therefore, the gear machining apparatus 1 can suppress the synchronization error between the rotation speed V1 of the workpiece W and the rotation speed V2 and the feed rate V4 of the gear cutting tool 42. As a result, the gear machining apparatus 1 can simplify the synchronization control of the rotation speed V2 of the gear cutting tool 42 by the tool rotation speed controlling portion 140 and the synchronization control of the feed rate V4 by the feed rate controlling portion 150.

Further, the workpiece rotation speed controlling portion 130 accelerates the rotation speed V1 of the workpiece W at a constant acceleration, and when the rotation speed V1 reaches the upper limit speed value, the rotation speed V1 may be made constant as in the third modification illustrated in FIG. 9. Similarly, the workpiece rotation speed controlling portion 130 decelerates the rotation speed V1 of the workpiece W at a constant deceleration as in a fourth modification illustrated in FIG. 9D, and when the rotation speed V1 reaches the lower limit speed value, the rotation speed V1 may be made constant.

In these cases, the gear machining apparatus 1 varies the rotation speed V1 of the workpiece W at a constant acceleration or deceleration like the first modification and the second modification. Therefore, the gear machining apparatus 1 can suppress the synchronization error between the rotation speed V1 of the workpiece W and the rotation speed V2 of the gear cutting tool 42. In addition, the gear machining apparatus 1 can gradually vary the rotation speed V1 as compared to the case where the rotation speed V1 of the workpiece W is repeatedly increased and decreased, so the rotation speed V1 of the workpiece W and the rotation speed V2 of the gear cutting tool 42, and the synchronization error with the feed rate V4 can be suppressed. Therefore, the gear machining apparatus 1 can simplify the synchronization control of the rotation speed V2 of the gear cutting tool 42 by the tool rotation speed controlling portion 140 and the synchronization control of the feed rate V4 by the feed rate controlling portion 150.

In addition, the gear machining apparatus 1 of the third modification and the fourth modification maintains the rotation speed V1 constant when the rotation speed V1 reaches the limit speed (the upper limit speed value or the lower limit speed value). Accordingly, a decrease in tool life of the gear cutting tool 42 is suppressed. Consequently, the gear machining apparatuses 1 of the third modification and the fourth modification may be able to vary the rotation speed V1 at optimum acceleration or deceleration even when the process time is long. Accordingly, the gear machining apparatus 1 can achieve both of improvement of the surface features of the machined surface formed on the workpiece W and improvement of the machining efficiency.

In the case of the third modification, the gear machining apparatus 1 is configured to perform the gear machining in a state in which the rotation speed V1 is set to the upper limit speed value when the rotation speed V1 reaches the upper limit speed value, and thus time required for the gear machining may be reduced.

Note that in the description of the third modification and the fourth modification, the workpiece rotation speed controlling portion 130 varies the rotation speed V1 from the start of the gear machining, and maintains the rotation speed V1 at a constant speed when the rotation speed V1 reaches a limit speed. However, the workpiece rotation speed controlling portion 130 is not limited thereto. In other words, the workpiece rotation speed controlling portion 130 may maintain the rotation speed V1 at the start of the gear machining constant, and then may start varying the rotation speed V1 after a predetermined time has elapsed. Accordingly, for example, when the rotation speed V1 is reduced at a constant deceleration after a predetermined time has elapsed from the start of the gear machining, the gear machining apparatus 1 can avoid an increase in length of a period when the rotation speed V1 becomes a low speed. Therefore, an increase of a time length required for the gear machining can be suppressed.

Figure 9E:
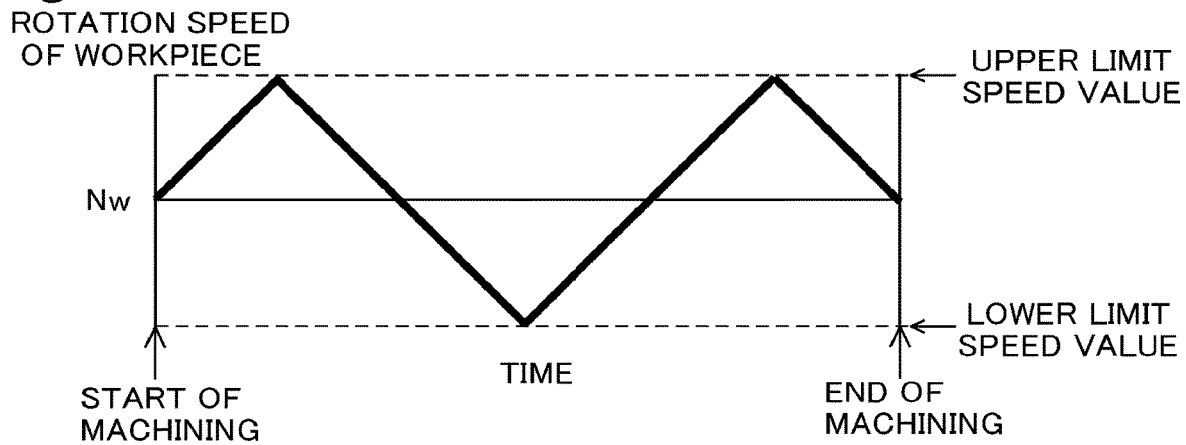
FIG. 9E is a graph illustrating a variation of the rotation speeds of a gear cutting tool and a workpiece according to a fifth modification.

Alternatively, as in a fifth modification illustrated in FIG. 9E, the workpiece rotation speed controlling portion 130 may decelerate the rotation speed V1 at a constant deceleration when the rotation speed V1 reaches the upper limit speed value and may accelerate the rotation speed V1 at a constant acceleration when the rotation speed V1 reaches the lower limit speed value. In this case, even in a case where the rotation speed V1 is increased and decreased repeatedly, the gear machining apparatus 1 can suppress the synchronization error between the rotation speed V1 of the workpiece W and the rotation speed V2 of the gear cutting tool 42 as compared to the case where the rotation speed V1 of the workpiece W is varied while changing the acceleration or the deceleration. Furthermore, in this case, since the gear machining apparatus 1 varies the rotation speed V1 of the workpiece W from the start to the end of the machining, the amplification of regenerative chattering vibration can be effectively suppressed.

Figure 6:
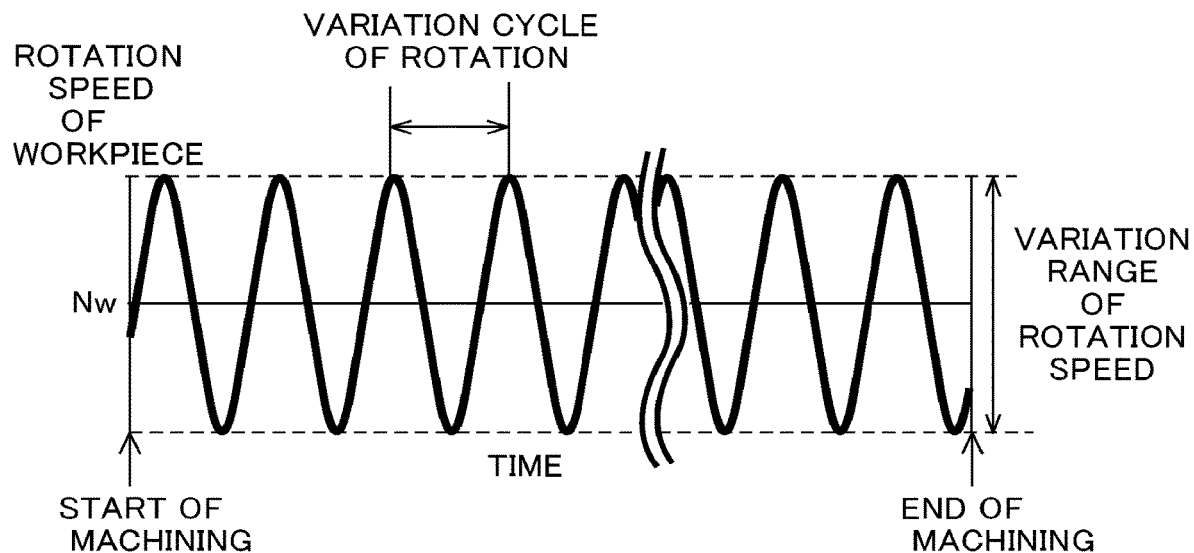
FIG. 6 is a graph illustrating variations in rotation speed of the gear cutting tool and the workpiece.

In the gear machining apparatus 1 in the fifth modification, the rotation speed V1 may be varied gently by increasing the variation cycle of the rotation speed V1 to a variation cycle much longer than the case of the gear machining process described in the first embodiment (see FIG. 6). Furthermore, in this case, the gear machining apparatus 1 is able to reduce the number of times of switching from acceleration to deceleration or from deceleration to acceleration of the rotation speed V1. Therefore, the gear machining apparatus 1 can suppress the synchronization error between the rotation speed V1 of the workpiece W and the rotation speed V2 of the gear cutting tool 42.

As described above, in the gear machining apparatuses 1 from the first modification to the fifth modification, the workpiece rotation speed controlling portion 130 varies the rotation speed V1 of the workpiece W at least temporarily at a constant acceleration or deceleration. In association with this, the tool rotation speed controlling portion 140 varies the rotation speed V2 of the gear cutting tool 42 at a constant acceleration or deceleration synchronously with the rotation speed V1 of the workpiece W. Therefore, the gear machining apparatus 1 can suppress the amplification of the regenerative chattering vibration generating in the workpiece W while rotating the gear cutting tool 42 at a high speed at the time of the gear machining. Therefore, both of an improvement of the surface features of a machined surface formed on the workpiece W and an improvement of the machining efficiency are achieved.

In addition, the gear machining apparatuses 1 from the first modification to the fifth modification varies the rotation speed V1 of the workpiece W at a constant acceleration or deceleration. Accordingly, synchronization control of the rotation speed V2 of the gear cutting tool 42 by the tool rotation speed controlling portion 140 and synchronization control of the feed rate V4 by the feed rate controlling portion 150 may be simplified. Consequently, the gear machining apparatus 1 can suppress the synchronization error between the rotation speed V1 of workpiece W and the rotation speed V2 and the feed rate V4 of the gear cutting tool 42.

In addition, the reference rotation speed setting portion 110 sets the reference rotation speed Nw based on the material of the workpiece W and the specifications of the gear cutting tool 42, and the workpiece rotation speed controlling portion 130 varies the rotation speed of the workpiece at a constant acceleration or deceleration with reference to the reference rotation speed Nw. Accordingly, the gear machining apparatus 1 may suppress lowering of the tool life of the gear cutting tool 42.

In addition, the workpiece rotation speed controlling portion 130 increases and decreases the rotation speed V1 of the workpiece W repeatedly, while the tool rotation speed controlling portion 140 varies the rotation speed V2 of the gear cutting tool 42 at a constant acceleration or deceleration synchronously with the rotation speed V1 of the workpiece W. In this case, the gear machining apparatus 1 does not have to consider the gear ratio between the gear cutting tool 42 and the workpiece W compared to the case where the reference rotation speed Nw of the gear cutting tool 42 is set, and thus easier setting of the reference rotation speed Nw is enabled correspondingly.

2. Second Embodiment

Figure 10:
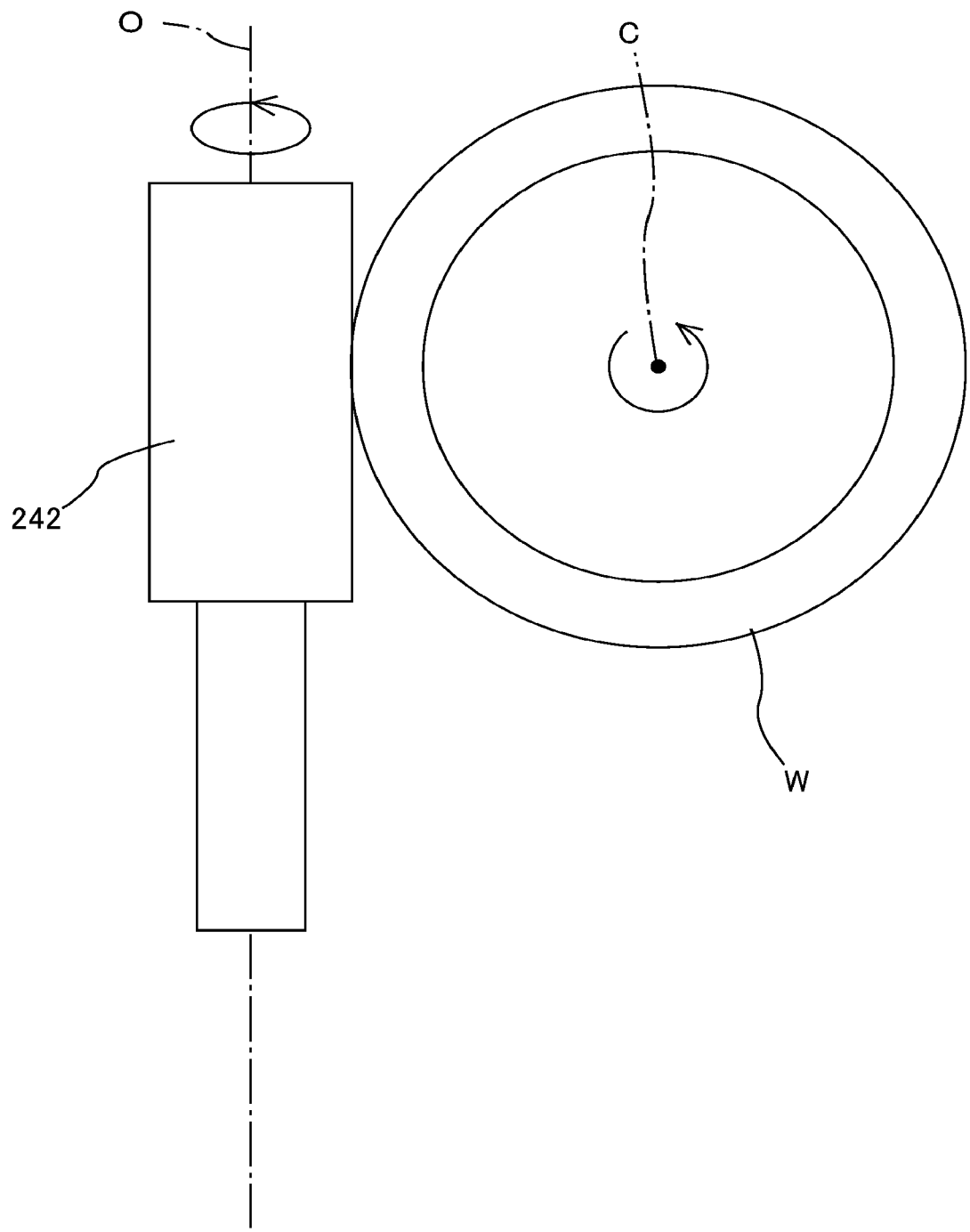
FIG. 10 is a drawing illustrating actions of a gear cutting tool and a workpiece when performing hobbing process according to a second embodiment.

Referring next to FIG. 10, a second embodiment will be described. In the description of the first embodiment, the gear cutting tool 42 is a skiving cutter and the gear machining apparatus 1 performs gear machining by the skiving process. In contrast, in the second embodiment, a gear cutting tool 242 is a hob cutter, and the gear machining apparatus 1 performs gear machining by a hobbing process. Note that like parts as in the above-described first embodiment are designated by the reference signs and description thereof will be omitted.

(2-1. Operation of Workpiece W and Gear Cutting Tool 242)

As illustrated in FIG. 10, a gear cutting tool 242 is a hob cutter. The gear machining apparatus 1 includes the gear cutting tool 242 and the workpiece W arranged so that the rotation axis O of the gear cutting tool 242 and the C-axis, which corresponds to the rotation axis of the workpiece W intersect. Note that in FIG. 10, the gear cutting tool 242 and the workpiece W are arranged so that the rotation axis O of the gear cutting tool 242 and the C-axis, which corresponds to the rotation axis of the workpiece W, are orthogonal to each other.

The gear machining apparatus 1 creates a gear on the workpiece W by feeding (relatively moving) the gear cutting tool 42 toward the Z-axis direction, which is a center axis of the workpiece W, while rotating the workpiece W and the gear cutting tool 42 individually at the time of gear machining. At this time, the gear machining apparatus 1 varies the rotation speed V1 of the workpiece W under the control of the workpiece rotation speed controlling portion 130 at the time of gear machining, and synchronizes the rotation speed V2 of the gear cutting tool 242 with the rotation speed V1 of the workpiece W under the control of the tool rotation speed controlling portion 140. Accordingly, the gear machining apparatus 1 can suppress the amplification of the regenerative chattering vibration generating in the workpiece W while rotating the gear cutting tool 42 at a high speed. Therefore, both of improvement of the surface features of a machined surface formed on the workpiece W and improvement of the machining efficiency are achieved.

3. Others

Although the present invention has been described thus far based on the embodiments described above, the invention is not limited to the embodiments described above, and various modifications may be made without departing the scope of the invention.

For example, in the respective embodiments, the workpiece rotation speed controlling portion 130 has been described with a case where the rotation speed V1 of the workpiece W is increased and decreased at a constant frequency. However, the rotation speed V1 does not necessarily have to be increased and decreased at a constant frequency as long as the rotation speed V1 of the workpiece W is increased and decreased at least repeatedly. The workpiece rotation speed controlling portion 130 may change the variation frequency of the rotation speed V1 of the workpiece W irregularly. Furthermore, in the description of the embodiments described above, the frequencies of the rotation speed V1 of the workpiece W in the respective cycles of variation match the variation frequency in the respective variation cycles. However, the configuration is not limited thereto as long as the rotation speed V1 of the workpiece W at each variation frequency is set to be increased and decreased at a frequency equal to or higher than the variation frequency.

In the description of the respective embodiments described above, the workpiece rotation speed controlling portion 130 increases and decreases the rotation speed V1 of the workpiece W repeatedly, and the tool rotation speed controlling portion 140 increases and decreases the rotation speed V2 of the gear cutting tool 42 synchronously with the rotation speed V1 of the workpiece W. However, the configuration is not limited thereto, and may include a case where the tool rotation speed controlling portion 140 increases and decreases the rotation speed V2 of the gear cutting tool 42 repeatedly, while the workpiece rotation speed controlling portion 130 increases and decreases the rotation speed V1 of the workpiece W synchronously with the rotation speed V2 of gear cutting tool 42. Alternatively, the tool rotation speed controlling portion 140 may change the variation frequency of the rotation speed V2 of the gear cutting tool 42 irregularly.

In the description of respective embodiments described above, the feed rate controlling portion 150 varies the feed rate V4 so that the feed rate V4 is synchronized with the rotation speed V1 of the workpiece W. However, the feed rate controlling portion 150 does not necessarily vary the feed rate V4. In other words, the gear machining apparatus 1 may suppress the amplification of the chattering vibration (regenerative type) generating in the workpiece W by varying the rotation speed V1 of the workpiece W and the rotation speed V2 of the gear cutting tool 42 so that at least the rotation speed V1 of the workpiece W and the rotation speed V2 of the gear cutting tool 42 are synchronized. Also, the feed rate controlling portion 150 may vary the feed rate V4 irregularly.

Note that the gear machining apparatus 1 may be a lateral type machining center or a machining center. Also, the gear machining apparatus 1 may be configured to be capable of adjusting a relative angle between the rotation axis of the workpiece W and the rotation axis of the gear cutting tool 42 by additionally providing a drive shaft orthogonal to any one of the rotation axis of the workpiece W and the rotation axis of the gear cutting tool 42. In addition, the gear machining apparatus 1 may be provided with a tool exchanging apparatus for exchanging the gear cutting tool 42 in accordance with the machining process (rough machining process, finishing process, etc.).

4. Advantageous Effect

As described above, the gear machining apparatus 1 according to the present invention is a gear machining apparatus configured to create a gear in a workpiece W by moving the gear cutting tool 42, 242 relative to the workpiece W along a direction of the rotation axis of the workpiece W while synchronously rotating the cutting tool 42, 242 and the workpiece w. The gear machining apparatus 1 includes the workpiece rotation speed controlling portion 130 configured to control the rotation speed V1 of the workpiece W and the tool rotation speed controlling portion 140 configured to control the rotation speed V2 of the gear cutting tool 42, 242.

One of the workpiece rotation speed controlling portion 130 and the tool rotation speed controlling portion 140 varies one of the rotation speed V1 of the workpiece W and the rotation speed V2 of the gear cutting tool 42, 242, the other one of the workpiece rotation speed controlling portion 130 and the tool rotation speed controlling portion 140 synchronizes the other one of the rotation speed V1 of the workpiece W and the rotation speed V2 of the gear cutting tool 42, 242 with one of the rotation speed V1 of the workpiece W and the rotation speed V2 of the gear cutting tool 42, 242.

According to the gear machining apparatus 1, when creating the gear on the workpiece W by the gear cutting tool 42, 242, a cutting force (cutting cross sectional area) of the gear cutting tool 42, 242 for cutting the workpiece W becomes uneven. Accordingly, amplification of a chattering vibration generating in the workpiece W is suppressed compared to a case where the rotation speed V1 of the gear cutting tool 42, 242 and the workpiece W are constant without variation. Consequently, with the gear machining apparatus 1, a cutting amount of the gear cutting tool 42 with respect to the workpiece W can be set to a large value while suppressing generation of the chattering vibration generating in a workpiece W. Therefore, the gear machining apparatus 1 can achieve both improvement of surface features of machined surface formed on workpiece W and improvement of machining efficiency.

In the gear machining apparatus 1 described above, one of the workpiece rotation speed controlling portion 130 and the tool rotation speed controlling portion 140 increases and decreases one of the rotation speed V1 of the workpiece W and the rotation speed V2 of the gear cutting tool 42, 242 repeatedly. The gear machining apparatus 1 can suppress the chattering vibration generating in the workpiece W. Therefore, both of improvement of the surface features of a machined surface formed on the workpiece W and improvement of the machining efficiency are achieved.

In the gear machining apparatus 1 described above, the upper speed values and the lower speed values of the rotation speed V1 of the workpiece W and the rotation speed V2 of the gear cutting tool 42, 242 are values obtained by multiplying the reference rotation speed Nw, which is a reference of machining of the workpiece W, by a preset speed increase-decrease rate, and one of the workpiece rotation speed controlling portion 130 and the tool rotation speed controlling portion 140 increases and decreases the rotation speed V1 of the workpiece W or the rotation speed V2 of the gear cutting tool 42, 242 between the rotation speed equal to or lower than the upper speed value and the rotation speed equal to or higher than the lower speed value. The gear machining apparatus 1 efficiently suppresses of the chattering vibration generating in the workpiece W. Therefore, improvement of the surface features of a machined surface formed on the workpiece W is achieved.

In the gear machining apparatus 1 described above, the variation frequency, which increases and decreases the rotation speed V1 of the workpiece W and the rotation speed V2 of the gear cutting tool 42, 242 repeatedly, is determined based on the reference rotation speed Nw of one of the workpiece W and the gear cutting tool 42, 242, and one of the workpiece rotation speed controlling portion 130 and the tool rotation speed controlling portion 140 varies the rotation speed V1 of the workpiece W or the rotation speed V2 of the gear cutting tool 42, 242 at a frequency equal to or higher than the variation frequency. The gear machining apparatus 1 efficiently suppresses of the chattering vibration generating in the workpiece W. Therefore, improvement of the surface features of a machined surface formed on the workpiece W is achieved.

In the gear machining apparatus 1 described above, one of the workpiece rotation speed controlling portion 130 and the tool rotation speed controlling portion 140 increases and decreases the rotation speed V1 of the workpiece W or the rotation speed V2 of the gear cutting tool 42, 242 at a constant frequency. In the gear machining apparatus 1, control of the rotation speed V1 of the workpiece W by the workpiece rotation speed controlling portion 130 or control of the rotation speed V2 of the gear cutting tool 42, 242 by the tool rotation speed controlling portion 140 may be simplified.

In the gear machining apparatus 1 described above, the workpiece rotation speed controlling portion 130 increases and decreases the rotation speed V1 of workpiece W repeatedly. Then, the tool rotation speed controlling portion 140 increases and decreases the rotation speed V2 of the gear cutting tool 42, 242 synchronously with the rotation speed V1 of workpiece W. The gear machining apparatus 1 allows easy setting of the reference rotation speed Nw.

In the gear machining apparatus 1 described above, one of the workpiece rotation speed controlling portion 130 and the tool rotation speed controlling portion 140 varies one of the rotation speed V1 of the workpiece W and the rotation speed V2 of the gear cutting tool 42, 242 at a constant acceleration and deceleration at least temporarily.

The gear machining apparatus 1 can suppress the chattering vibration generating in the workpiece W. Therefore, both of improvement of the surface features of a machined surface formed on the workpiece W and improvement of the machining efficiency are achieved. In addition, the gear machining apparatus 1 varies the rotation speed V1 of the workpiece W at a constant acceleration or deceleration. Accordingly, synchronization control of the rotation speed V2 of the gear cutting tool 42 by the tool rotation speed controlling portion 140 may be simplified. Therefore, the gear machining apparatus 1 can suppress a synchronization error between the rotation speed V1 of the workpiece W and the rotation speed V2 of the gear cutting tool 42.

In the gear machining apparatus 1 described above, one of the workpiece rotation speed controlling portion 130 and the tool rotation speed controlling portion 140 varies the rotation speed V1 of the workpiece W or the rotation speed V2 of the gear cutting tool 42, 242 at a constant acceleration or deceleration during a period from the start to the end of the gear machining. Since the gear machining apparatus 1 varies the rotation speed V1 of the workpiece W or the rotation speed V2 of the gear cutting tool 42, 242 from the start to the end of the machining, amplification of regenerative chattering vibration is effectively suppressed.

In the gear machining apparatus 1 described above, one of the workpiece rotation speed controlling portion 130 and the tool rotation speed controlling portion 140 makes the rotation speed V1 of the workpiece W or the rotation speed V2 of the gear cutting tool 42, 242 constant when the rotation speed V1 of the workpiece W or the rotation speed V2 of the gear cutting tool 42, 242 reaches a predetermined limit speed (an upper limit speed value or a lower limit speed value).

The gear machining apparatus 1 can suppress lowering of the tool life while varying the rotation speed V1 of the workpiece W and the rotation speed V2 of the gear cutting tool 42, 242 at an optimal acceleration or deceleration even when the process time is long. Accordingly, the gear machining apparatus 1 can achieve both of improvement of the surface features of the machined surface formed on the workpiece W and improvement of the machining efficiency.

In the gear machining apparatus 1 described above, one of the workpiece rotation speed controlling portion 130 and the tool rotation speed controlling portion 140 varies the rotation speed V1 of the workpiece W at a constant acceleration or deceleration with reference to the reference rotation speed Nw set based on the material of the workpiece W and the specifications of the gear cutting tool 42, 242, while the tool rotation speed controlling portion 140 varies the rotation speed V2 of the gear cutting tool 42, 242 at a constant acceleration or deceleration synchronously with the rotation speed V1 of the workpiece W. The gear machining apparatus 1 allows easy setting of the reference rotation speed Nw.

The gear machining apparatus 1 described above includes the feed rate controlling portion 150 configured to vary the feed rate V4 of the gear cutting tool 42 with respect to the workpiece W in the direction of the rotation axis in synchronous with the frequency of the rotation speed V1 of the varying workpiece W. The gear machining apparatus 1 is able to further improve the surface features of the machined surface formed on the workpiece W compared to a case of varying the rotation speed V1 of the workpiece W and the rotation speed V2 of the gear cutting tool 42, and on the other hand, maintaining the feed rate V4 constant without variation.

In the gear machining apparatus 1 described above, the gear cutting tool 42 is a skiving cutter, and the gear machining apparatus 1 is configured to perform a skiving process for a gear on the workpiece W by moving the gear cutting tool 42 relatively with respect to the workpiece W along the direction of the rotation axis of the workpiece W in a state in which the rotation axis of the workpiece W is inclined with respect to the rotation axis of the gear cutting tool 42. When the skiving process for forming a gear on the workpiece W is performed, the gear machining apparatus 1 can achieve both improvement of surface features of machined surface formed on the workpiece W and improvement of machining efficiency.

In the gear machining apparatus 1 described above, the gear cutting tool 242 is a hob cutter, and the gear machining apparatus 1 is configured to perform a hobbing process for a gear on the workpiece W by moving the gear cutting tool 242 relatively with respect to the workpiece W along the direction of the rotation axis of the workpiece W in a state in which the rotation axis of the workpiece W is inclined with respect to the rotation axis of the gear cutting tool 242. When the hobbing process for forming a gear on the workpiece W is performed, the gear machining apparatus 1 can achieve both improvement of surface features of machined surface formed on the workpiece W and improvement of machining efficiency.

In addition, the gear machining method according to the present invention is a gear machining method for creating a gear in a workpiece W by moving the gear cutting tool 42, 242 relative to the workpiece W along the direction of the rotation axis of the workpiece W while synchronously rotating the cutting tool 42, 242 and the workpiece W. The gear machining method includes a workpiece rotation speed setting step S1 for varying the rotation speed V1 of the workpiece W and a tool rotating speed setting step S2 configured to vary the rotation speed V2 of the gear cutting tool 42, 242 synchronously with a variation of the rotation speed V1 of the workpiece W, which is set by the workpiece rotation speed setting step.

According to the gear machining method, a cycle of contact of the gear cutting tool 42, 242 with the workpiece W becomes irregular when the gear is formed on the workpiece W by the gear cutting tool 42, 242. Accordingly, amplification of a regenerative chattering vibration generating in the workpiece W is suppressed compared to a case where the rotation speeds of the gear cutting tool 42, 242 and the workpiece W are constant without variation. Consequently, with the gear machining method, a cutting amount of the gear cutting tool 42, 242 with respect to the workpiece W can be set to a large value while suppressing generation of the chattering vibration generating in the workpiece W. Therefore, the gear machining method can achieve both improvement of surface features of machined surface formed on the workpiece W and improvement of machining efficiency.

The gear machining method described above includes the feed rate setting step S3 configured to vary the feed rate V4 of the gear cutting tool 42, 242 with respect to the workpiece W in the direction of the rotation axis in synchronous with the frequency of the rotation speed V1 of the varying workpiece W. The gear machining method is able to improve the surface features of the machined surface formed on the workpiece W compared to a case of varying the rotation speed V1 of the workpiece W and the rotation speed V2 of the gear cutting tool 42, 242 and on the other hand, maintaining the feed rate V4 constant without variation.

REFERENCE SIGNS LIST

1: gear machining apparatus, 42: gear cutting tool, 130: workpiece rotation speed controlling portion, 140: tool rotation speed controlling portion, 150: feed rate controlling portion, Nw: reference rotation speed, W: workpiece, S1: workpiece rotation speed setting step, S2: tool rotation speed setting step, S3: feed rate setting step

The invention claimed is:

1. A gear machining method for creating a gear in a workpiece by moving a gear cutting tool relative to the workpiece along a direction of a rotation axis of the workpiece while synchronously rotating the gear cutting tool and the workpiece, the gear machining method comprising:
   a workpiece rotation speed setting step for varying a rotation speed of the workpiece, and
   a tool rotation speed setting step for varying the rotation speed of the gear cutting tool synchronously with variation in the rotation speed of the workpiece set in the workpiece rotation speed setting step, wherein
   one of the workpiece rotation speed setting step and the tool rotation speed setting step repeatedly increases and decreases the rotation speed of the one of the workpiece and the gear cutting tool by a predetermined rate of at least 5% of a reference rotation speed, the reference rotation speed based on a cutting speed and an intersection angle for creating the gear, and
   the other one of the workpiece rotation speed setting step and the tool rotation speed setting step synchronizes the rotation speed of the other one of the workpiece and the gear cutting tool with the rotation speed of the one of the workpiece and the gear cutting tool.

2. The gear machining method according to claim 1, further comprising:
   a feed rate setting step for varying a feed rate of the gear cutting tool with respect to the workpiece in the direction of the rotation axis synchronously with a frequency of a varying rotation speed of the workpiece.

3. The gear machining method according to claim 1, wherein
   an upper speed value and a lower speed value of the rotation speed of the one of the workpiece and the gear cutting tool are obtained by multiplying the reference rotation speed of the workpiece or the gear cutting tool by the predetermined rate, and
   the one of the workpiece rotation speed setting step and the tool rotation speed setting step increases and decreases the rotation speed of the workpiece or the gear cutting tool repeatedly between the rotation speed equal to or lower than the upper speed value and the rotation speed equal to or higher than the lower speed value.

4. The gear machining method according to claim 3, wherein a variation frequency for increasing and decreasing the rotation speed of the one of the workpiece and the gear cutting tool repeatedly is determined based on the reference rotation speed of the one of the workpiece and the gear cutting tool, and
the one of the workpiece rotation speed setting step and the tool rotation speed setting step varies the rotation speed of the workpiece or the gear cutting tool at a frequency equal to or higher than the variation frequency.

5. The gear machining method according to claim 1, wherein
the one of the workpiece rotation speed setting step and the tool rotation speed setting step increases and decreases the rotation speed of the workpiece or the gear cutting tool at a constant frequency.

6. The gear machining method according to claim 1, wherein
the workpiece rotation speed setting step increases and decreases the rotation speed of the workpiece repeatedly, and
the tool rotation speed setting step increases and decreases the rotation speed of the gear cutting tool repeatedly synchronously with the rotation speed of the workpiece.

7. The gear machining method according to claim 1, wherein
the one of the workpiece rotation speed setting step and the tool rotation speed setting step at least temporarily varies the rotation speed of one of the workpiece and the gear cutting tool at a constant acceleration or deceleration.

8. The gear machining method according to claim 7, wherein
the one of the workpiece rotation speed setting step and the tool rotation speed setting step varies the rotation speed of the workpiece or the rotation speed of the gear cutting tool at a constant acceleration or deceleration during a period from a start to an end of gear machining.

9. The gear machining method according to claim 1, further comprising:
a feed rate setting step for varying a feed rate of the gear cutting tool with respect to the workpiece in the direction of the rotation axis synchronously with a varying rotation speed of the workpiece.

10. The gear machining method according to claim 1, further comprising:
a skiving step for performing a skiving process for creating the gear on the workpiece by moving the gear cutting tool as a skiving cutter relatively with respect to the workpiece along the direction of the rotation axis of the workpiece with the rotation axis of the workpiece being inclined with respect to the rotation axis of the gear cutting tool.

11. The gear machining method according to claim 1, further comprising:
a hobbing step for performing a hobbing process for creating the gear on the workpiece by moving the gear cutting tool as a hobbing cutter relatively with respect to the workpiece along the direction of the rotation axis of the workpiece with the rotation axis of the workpiece being inclined with respect to the rotation axis of the gear cutting tool.

* * * * *